(12) United States Patent
Pauchard

(10) Patent No.: US 11,327,027 B2
(45) Date of Patent: May 10, 2022

(54) METHOD AND A MACHINE FOR CHECKING THE QUALITY OF A PRODUCT

(71) Applicant: BOBST MEX SA, Mex (CH)

(72) Inventor: Alexandre Pauchard, Chatel-St-Denis (CH)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 16/635,019

(22) PCT Filed: Aug. 16, 2018

(86) PCT No.: PCT/EP2018/025214
§ 371 (c)(1),
(2) Date: Jan. 29, 2020

(87) PCT Pub. No.: WO2019/034289
PCT Pub. Date: Feb. 21, 2019

(65) Prior Publication Data
US 2020/0240926 A1 Jul. 30, 2020

(30) Foreign Application Priority Data

Aug. 17, 2017 (EP) .................................. 17020363

(51) Int. Cl.
*G01N 21/89* (2006.01)
*G01N 21/88* (2006.01)

(52) U.S. Cl.
CPC ..... *G01N 21/8901* (2013.01); *G01N 21/8914* (2013.01); *G01N 2021/8841* (2013.01); *G01N 2021/8917* (2013.01)

(58) Field of Classification Search
CPC ........... G01N 21/8901; G01N 21/8914; G01N 2021/8841; G01N 2021/8917;
(Continued)

(56) References Cited

U.S. PATENT DOCUMENTS 5,212,656 A * 5/1993 Clary ..................... G01B 11/04
702/84
6,323,502 B1 * 11/2001 Battut ..................... G01B 11/02
250/559.19
(Continued)

FOREIGN PATENT DOCUMENTS

JP 2001-124528 A 5/2001
JP 2001-194124 A 7/2001
(Continued)

OTHER PUBLICATIONS

International Search Report dated Nov. 26, 2018 in counterpart International Patent Application No. PCT/EP2018/025214 (4 pages, in English).

*Primary Examiner* — Deoram Persaud
(74) *Attorney, Agent, or Firm* — Bookoff McAndrews, PLLC

(57) ABSTRACT

The invention relates to a method for checking the quality of a product (1) comprising at least two cardboard portions (2) connected to each other such that a slot (10) extends between the cardboard portions from one side of the product (1) to the opposite side, with the slot (10) being expected to extend perpendicularly with respect to an outer edge of the product (1), comprising the steps of:
  capturing a 2D image of the slot (10) at one side of the product (1) and of the slot at the opposite side of the product,
  analyzing the images so as to recognize the slot (10),
  comparing the positions of the slot of one product at the opposite sides,
  making a determination whether or not a difference between the positions is within a predefined range of tolerance.

(Continued)

Figure 1:
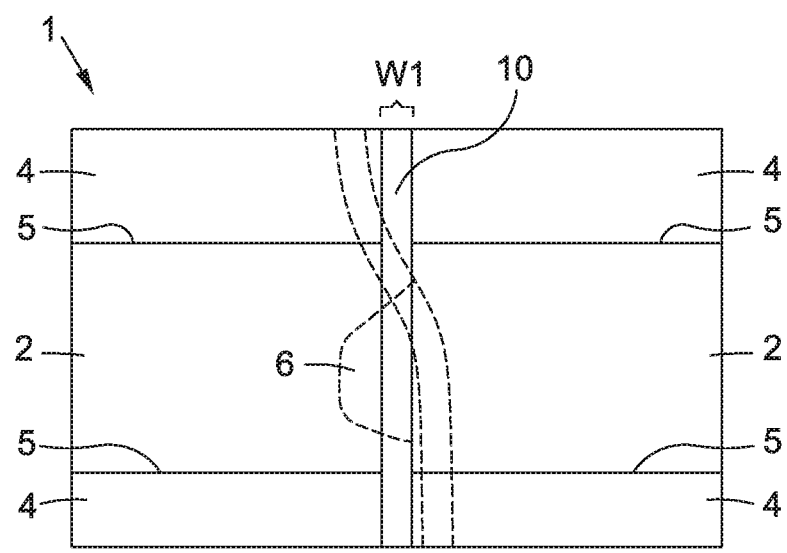

The invention further relates to a machine for checking the quality of a product (1) made from at least two cardboard portions (2) connected to each other such that a slot (10) extends from one side of the product to the opposite side, with the slot being expected to extend perpendicularly with respect to an outer edge of the product, the machine comprising two cameras (304) adapted for capturing a 2D image in a stacking area for stacking the products, an image processing module (306) adapted for recognizing in the captured images the position of the slot on the two sides of the product, and an offset determination module (310) adapted for determining the amount of offset between the position of the slots at the opposite sides of the product.

11 Claims, 3 Drawing Sheets

(58) Field of Classification Search
CPC ....... G01N 2021/8887; G01N 21/8851; G01N 21/86; G01B 11/02; B07C 5/342; B31B 2100/00; B31B 2100/0022; B31B 2110/35; B31B 2120/30; B31B 50/003; B31B 50/006; B31B 50/81; B31B 50/98
See application file for complete search history.

(56) References Cited

U.S. PATENT DOCUMENTS

| | | | |
|---|---|---|---|
| 10,466,687 B2 * | 11/2019 | Diehr | G05B 19/41875 |
| 10,977,749 B2 * | 4/2021 | Widner | G06F 17/18 |
| 2017/0348940 A1 | 12/2017 | Amoros et al. | |
| 2020/0198281 A1 * | 6/2020 | Hill | G01B 11/022 |

FOREIGN PATENT DOCUMENTS

| | | | | |
|---|---|---|---|---|
| JP | 2003-337012 A | 11/2003 | | |
| JP | 2009-172842 A | 8/2009 | | |
| JP | 2013-068544 A | 4/2013 | | |
| KR | 20170091742 A | 8/2017 | | |
| TW | 201636269 A | 10/2016 | | |
| WO | 2013/118080 A1 | 8/2013 | | |
| WO | 2016/096157 A1 | 6/2016 | | |
| WO | WO-2016096157 A1 * | 6/2016 | ........... | B31B 50/006 |
| WO | WO-2017143589 A1 * | 8/2017 | ............ | G06T 7/248 |

* cited by examiner

METHOD AND A MACHINE FOR CHECKING THE QUALITY OF A PRODUCT

CROSS-REFERENCE TO RELATED APPLICATION(S)

This application is a National Stage under 35 U.S.C. § 371 of International Application No. PCT/EP2018/025214, filed Aug. 16, 2018, which claims priority to European Patent Application No. 17020363.2, filed Aug. 17, 2017, the contents of all of which are incorporated by reference in their entirety.

The invention relates to a method and a machine for checking the quality of a product comprising at least two cardboard portions connected to each other such that a slot extends between the cardboard portions from one side of the product to the opposite side, with the slot being expected to extend perpendicularly with respect to an outer edge of the product.

The product can in particular be a foldable box such as a packaging box. During manufacture of the boxes, cardboard portions are glued to each other. Between adjacent cardboard portions, a slot extends transversely from one side of the box to the opposite side.

The cardboard portions can be oppositely arranged portions of one and the same cardboard element (if the cardboard element forms the wall of the box in at least one circumferential direction so that the oppositely arranged portions come to lie close to each other such that they are separated by the slot), or the cardboard portions are separate cardboard elements which are connected to each other so as to form the box.

Assuming that the cardboard portions are glued to each other correctly, the slot has a constant dimension over the entire width. Otherwise, the dimensions change over the width.

It is known from WO 2016/096157 A1 to inspect the width of the slot. Generally speaking, the width of the slot is measured at the opposite sides of the product. If the width is (within certain tolerances) the same and lies within a predefined range, then the quality is considered to be okay.

It has however turned out that the cardboard portions sometimes are not perfectly square. Then, it is possible that the slot extends obliquely or along a curved path from one side of the box to the other and has the same width at the opposite sides of the box. This kind of defect is called "squaring issue" as it is the result of the cardboard portions not being square.

When checking such product with the device and method of WO2016/096157 A1, the box is found to be okay even though the slot as such does not correspond to the quality expectations.

The object of the invention thus is to allow detecting squaring issues.

In order to achieve this object, the invention provides a method for checking the quality of a product comprising at least two cardboard portions connected to each other such that a slot extends between the cardboard portions from one side of the product to the opposite side, with the slot being expected to extend perpendicularly with respect to an outer edge of the product, comprising the steps of:
 capturing a two-dimensional image (or 2D image) of the slot at one side of the product and of the slot at the opposite side of the product,
 analyzing the images so as to recognize the slot,
 comparing the positions of the slot of one product at the opposite sides,
 making a determination whether or not a difference between the positions is within a predefined range of tolerance.

By two-dimensional image we mean an image whose pixel values represent one or several photometric values. For example, the image pixel may have one grayscale value (resulting in a greyscale 2D image) or three values representing a red, a blue and a green channel (resulting in a color 2D image). An image whose pixel values represent the distance between the camera and the part of the scene related to the pixel is not considered as a two-dimensional image. Preferably, we use a greyscale 2D image.

The positions are measured along the direction of the outer edge of the product. In this context, a position is a one-dimensional number. The image can be constructed so that this direction is horizontal (according to the image coordinates), and thus the position is the horizontal location of the slot.

The invention further provides a machine for checking the quality of a product made from at least two cardboard portions connected to each other such that a slot extends from one side of the product to the opposite side, with the slot being expected to extend perpendicularly with respect to an outer edge of the product, the machine comprising two cameras adapted for capturing a 2D image in a stacking area for stacking the products, an image processing module adapted for recognizing in the captured images the position of the slot on the two sides of the product, and an offset determination module adapted for determining the amount of offset between the position of the slots at the opposite sides of the product The principle underlying the invention is to check if the slot is, on the opposite sides of the product, at the same position. If it is, then this is an indication that no squaring issue exists. The main advantage of the method and the machine according to the invention is that the determination of the position of the slots can be made very quickly without much computational effort. Further, the hardware of the machine known from WO 2016/096157 A1 can be "upgraded" so that the slot can not only be inspected with respect to a constant width but also with respect to squaring issues. "Upgrade" here means adding further analyzing capabilities on the software level; no additional hardware is required.

According to an embodiment of the invention, the 2D images are being captured with two cameras, with each camera being assigned to one side of the product to be checked. Using a 2D camera allows obtaining high quality images at a high frequency and with a low data volume.

An even lower data volume can be achieved if a 1D camera (line camera) is being used (or if only a single line of a 2D camera is being used). When using a line camera, a two-dimensional image may be obtained by moving the camera, as explained later in the description.

According to a preferred embodiment of the invention, the cameras are being calibrated with the aid of a calibration target. By capturing the images of the slots of the calibration target, the precise position of the two cameras with respect to each other is made available. After the calibration step, it is known at which position the two slots are "seen" from the cameras for a product which perfectly fulfils the quality requirements.

The thus obtained calibration value can be stored in a memory within the offset determination module or generally speaking within the machine control. From time to time, the calibration is repeated so as to ensure that any tolerances occurring over the time are being recognized and appropriately taken into account when checking the quality of the products.

Preferably, the 2D images are being captured for a stack of products. It is thus very conveniently possible to conduct the quality control when the products are not moving because they have been stacked. Also, the glue of a folded box might still be fresh when stacking the products, possibly causing a slight motion of the glued parts. The defect resulting from this slight motion is checked if the quality control is performed on a stack of products (i.e. after the stacking operation).

In order to keep the data volume as small as possible, the 2D images are being captured for a portion of the sides of the product which is a small fraction of the length of the sides, preferably less than 10% of the length of the sides. The area "covered" by the cameras is thus preferably limited to the range in which the slots are typically located (or, if a wider image is being captured, is electronically limited to a smaller area of interest). Should the cameras not detect the slot within this range, then it can be assumed that the product is to be rejected anyhow.

According to an embodiment of the invention, the center of the slot is determined during the step of analyzing the images for recognizing the slots. The positions of the two centers can be compared more conveniently than comparing e.g. the two outer edges of each slot.

Figure 2:
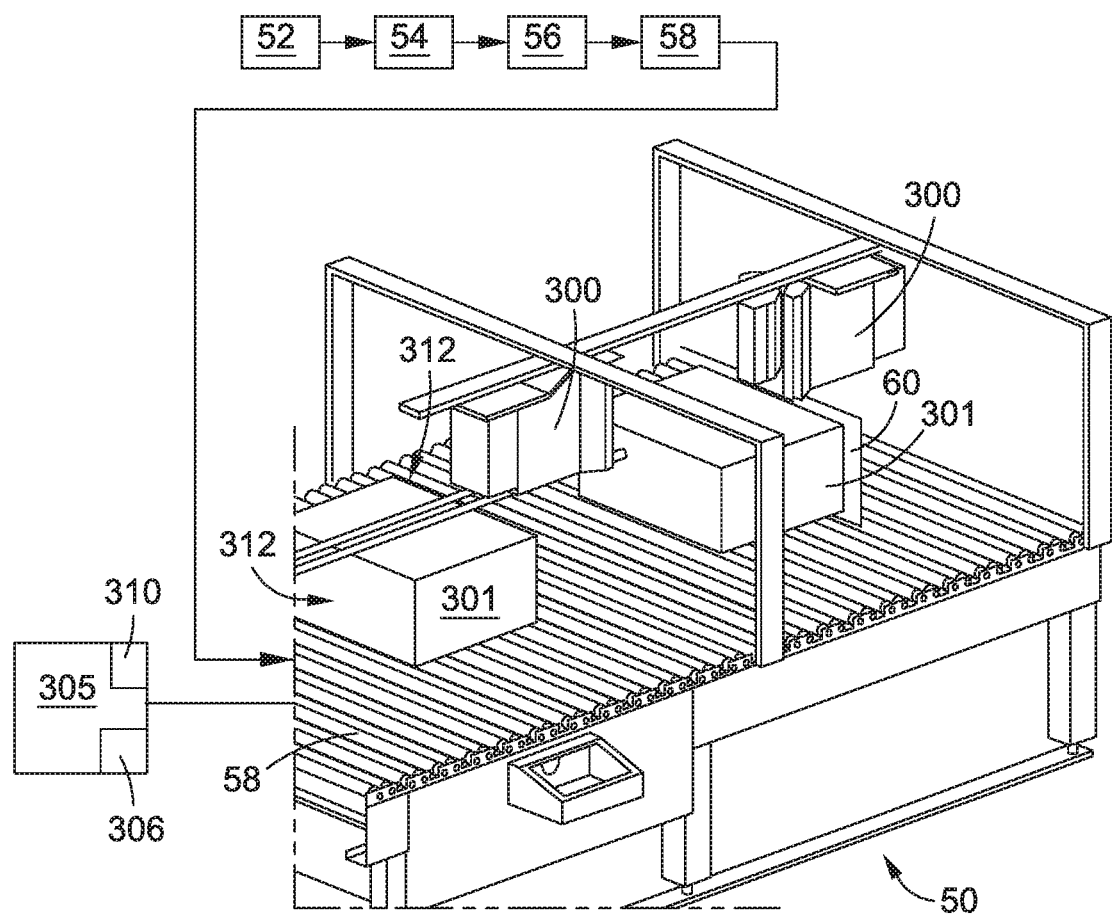
Figure 3:
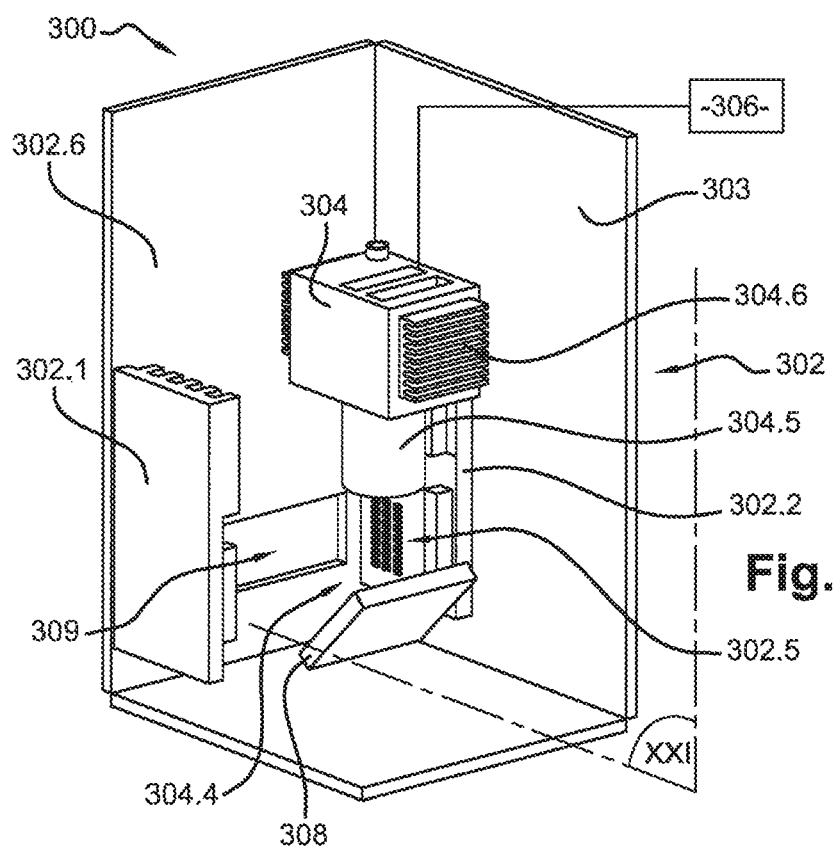
Figure 4:
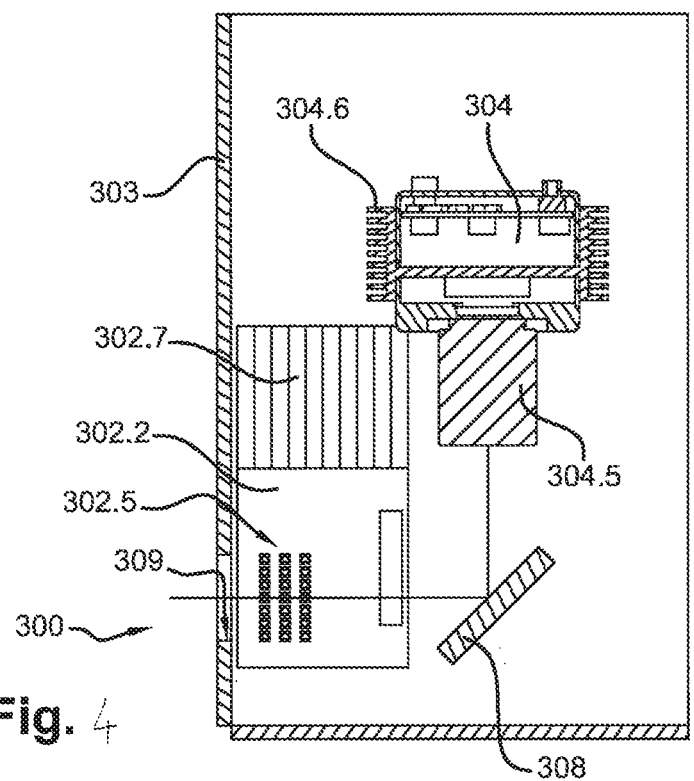
Figure 5:
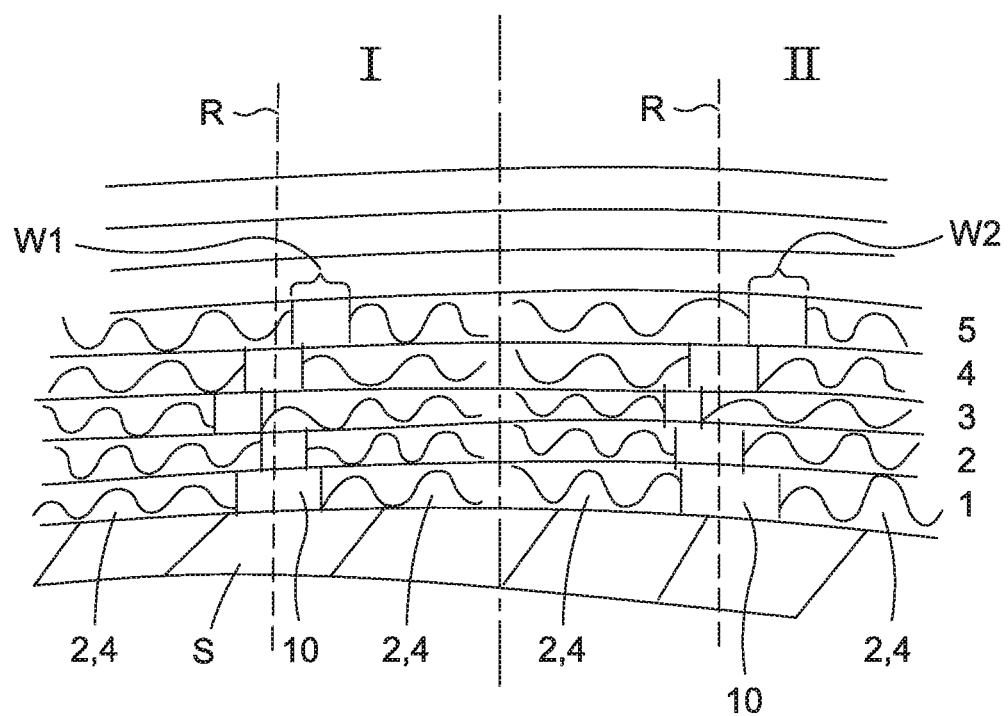

The invention will not be described with reference to an embodiment shown in the enclosed drawings. In the drawings, FIG. 1 shows an example of a product with a squaring issue, FIG. 2 schematically shows a machine according to the invention, FIG. 3 schematically shows one of the cameras used in the machine of FIG. 2, FIG. 4 schematically shows the camera of FIG. 3 in a cross-section, FIG. 5 schematically shows the images captured with the machine of FIG. 2.

FIG. 1 shows a foldable box 1 which is used here as an example of the product for which the quality is to be checked. The box 1 is shown in FIG. 1 in the folded state, comprising cardboard portions 2 which are connected to each other and comprises flaps 4 connected to the cardboard portions 2 by means of folds 5. Here, adjacent cardboard portions 2 are glued to each other with the aid of a tongue 6.

Between adjacent cardboard portions 2, a slot 10 is present. Ideally, the slot extends perpendicularly with respect to the outer edges of the foldable box.

In practice, the cardboard portions 2 are sometimes not square but have the form shown with a broken line in FIG. 1. This is referred to as "squaring issue".

It can be seen that the width of the slot 10 is generally constant over the width, meaning that the width W1, W2 which can be measured at the opposite sides of the product is the same. Thus, no quality issue is detected if the width of the slot at the opposite sides is compared with each other (and if further the width as such is within a predefined value).

For comparing the width of the slot at the opposite sides of the product, a machine is known from WO 2016/096157 A1, the disclosure of which is incorporated herein by reference.

FIG. 2 shows a machine 50 which largely corresponds to the machine disclosed in WO 2016/096157 A1, but contains some modifications.

Machine 50 shown in FIG. 2 is intended to manufacture foldable boxes 1 and comprises at least:
- a gluing device 52 configured to apply glue to a gluing area of each foldable box 1,
- a folding device 54 configured to fold the cardboard portions 2 so as to glue an area to be glued onto the gluing area,
- a stacking device 56 configured for stacking the foldable boxes 1 in the folded state,
- a squaring device 60 configured for squaring the foldable boxes 1 so as to form packs 301,
- a conveying device 58, configured to place the foldable boxes 1 in the gluing device 52, then in the folding device 54, then in the stacking device 56; in this case, the conveying device 58 is a belt conveyor providing an output rate of the installation equal to about 1800 foldable boxes 1 per hour, and
- two checking devices 300.

Here, the checking devices 300 are placed downstream of the stacking device 56 and of the squaring device 60. The gluing device 52, the folding device 54, the stacking device 56 and the squaring device 60 follow one another from the upstream to the downstream end, in the direction of circulation determined by the conveying device 58. Each checking device 300 therefore checks the foldable boxes 1 in packs 301.

Additionally, the two checking devices 300 are arranged so as to form respective images of two peripheral pack faces 312. This arrangement can be used to check all the slots of each foldable box 1 contained in a pack 301.

The basic construction of each of the checking devices 300 is shown in FIGS. 3 and 4.

Each checking device comprises an illumination system 302 with two light sources 302.1 and 302.2, a framework 303, a camera 304, a schematically indicated machine control 305 and an image processing module 306.

The camera 304 is a line scan camera. A line scan camera is a camera in which the photosensitive part is composed of a line of sensors (with a dimension of 1×n). The sensors may be CCD ("Charge-Coupled Device") sensors, or CMOS ("Complementary Metal-Oxide-Semiconductor") sensors. The camera 304 is configured to receive an optical beam 304.4.

Each checking device 300 is formed by a single camera 304. The camera 304 has an optical correction device 304.5 and a heat sink 304.6 configured to cool the camera 304 in use.

Each illumination source 302.1 and 302.2 is composed of light-emitting diodes (LED) 302.5 arranged in a rectangular matrix. Each illumination source 302.1 and 302.2 comprises a respective heat sink 302.6 and 302.7.

Further, the checking device 300 comprises a reflecting mirror 308 arranged so as to reflect the light received from each pack of foldable boxes toward the camera 304. This reflecting mirror 308 makes it possible to form a compact checking device 300. Each illumination source 302.1 and 302.2 directly illuminates each pack of foldable boxes through an aperture 309 formed in the framework 303.

In practice, the image obtained from a camera 304 is a small fraction of the length of the outer edges of the products 1. Each image can "cover" only the small region within which the slot to be analyzed typically is arranged, taking into account the normal tolerances. By reducing the coverage of the camera 304, the duration of the image processing can be minimized.

In this case, the checking device 300 is positioned in line; that is to say, the checks are made when the conveying device 58 brings the packs 301 to a position in front of the checking device 300. The conveying device 58 is arranged to convey the packs 301 in a horizontal direction.

For capturing the images, the checking device 300 is moved vertically with respect to the packs 301. Preferably, both checking devices 300 at opposite ends of the folded boxes of pack 301 are moved simultaneously so that the front and the back of a foldable box are acquired simultaneously, ensuring that the box has not moved between captures.

With this machine, it is generally possible to check if the width of the slots at opposite ends of the folded boxes is the same (within a predefined range of tolerances). Regarding the details of this check, reference is made to WO 2016/096157 A1.

For identifying squaring issues, the machine has an offset determination module 310 which allows determining whether the slot 10 "ends" at the opposite sides at the same position, as this is the case when the cardboard portions 2 are square and the slot extends perpendicularly with respect to the outer edges of the product.

The offset determination module 310 processes the very same images which are used by the image processing module 306. In an alternative, the offset determination module 310 is incorporated into the image processing module 306.

Generally speaking, squaring issues are detected by comparing the positions at which a particular slot is visible at the opposite sides of a product. If the slot ends at the opposite sides at the same position (meaning: along a line which perpendicular with respect to the outer edges of the product), then the cardboard portions 2 are square, and the quality is okay.

For determining the position of the slot at the opposite ends of the product, the images captured with the cameras 304 are being analyzed. In particular, the position of the center of the slot at the opposite ends is being determined.

In a subsequent step, the positions of the centers are compared, e.g. by subtracting them from each other. If the result of the comparison is below a certain threshold, then the quality is considered to be okay (with respect to a potential squaring issue).

For a proper determination of squaring issues, a calibration step is conducted which allows the machine 50 to learn the position of the cameras 304 on opposite sides of the stack. Assuming that the cameras 304 are at the same position with respect to the stack, the difference of the positions of the ends of the slot in the calibration target is zero. If the cameras 304 are arranged with a slight offset from the theoretical position, the comparison made by the offset determination module results in a certain calibration value which can be stored in a memory 312. Thus, the offset determination module 310 takes this offset into account when making the next offset determinations.

FIG. 5 shows an example of the images captured with the cameras 304 at opposite sides of the stack of products 2 collected on a support S.

In area I, an example of the images of one lateral side of the products are shown (e.g. the upper side of the product shown in FIG. 1), and in area II, the corresponding images of the opposite side of the product are shown (here the lower side of the product shown in FIG. 1).

For easier reference, the products are labeled with numbers starting with 1 for the lowermost product 2. Further, a virtual reference line R is depicted here for each of the images. This line corresponds to the location of the slots at the sides of the product, determined with a calibration target.

For the first product 2, the slot 10 ends at the opposite sides at a close to perfect location. The center of the openings of the slot 10 at the two sides of product 2 is where the reference lines R are.

For the second product, the center of the slot on one side (area I) is on the right side of the reference line R while the center of the slot in on the other side (area II) is on the left side of the reference line R. This means that the center of the slot is for both sides displaced in the same direction (looking at FIG. 1: to the left) so that it is a question whether or not the difference in the width of the slot at the opposite sides is within a predefined tolerance range.

For the third product 2, the center of the slots is offset significantly from each other as one they are arranged on opposite sides of the reference line I (one has to bear in mind that one of the images is mirror-inverted by showing it side by side with the other one in FIG. 5). The third product thus has a squaring issue.

For the fourth product 2, the slot 10 again ends at the opposite sides at a close to perfect location.

For the fifth product 2, a squaring issue is present.

The machine control is thus able to very quickly check the quality of the products not only with respect to a constant width of the slots but also with respect to squaring issues.

The invention claimed is:

1. A method for checking a quality of a product, the product comprising at least two cardboard portions connected to each other such that a slot extends between the at least two cardboard portions from one side of the product to an opposite side, the slot being expected to extend perpendicularly with respect to an outer edge of the product, the method comprising:
capturing a first two-dimensional image of the slot at the one side of the product and a second two-dimensional image of the slot at the opposite side of the product,
analyzing the first two-dimensional image and the second two-dimensional image to recognize the slot and determine positions of the slot at the one side and the opposite side, the positions being measured along the outer edge of the product as a horizontal image coordinate location of the slot according to image coordinates with respect to a reference,
comparing the positions of the slot at the one side and the opposite side to determine a difference between the positions, and
making a determination whether or not the difference between the positions is within a predefined range of tolerance.

2. The method of claim 1, wherein the first two-dimensional image and the second two-dimensional image are captured by a first camera and a second camera, respectively, the first camera is arranged to the one side of the product, and the second camera is arranged to the opposite side of the product, so that the product does not move between capturing the first two-dimensional image and the second two-dimensional image.

3. The method of claim 2, wherein the first camera and the second camera are line cameras that capture one dimensional images while being moved vertically to scan the product to thereby form the first two-dimensional image and the second two-dimensional image.

4. The method of claim 2, wherein the first camera and the second camera are calibrated with a calibration target.

5. The method of claim 1, wherein the first two-dimensional image and the second two-dimensional image are captured for a stack of products.

6. The method of claim 1, wherein the first two-dimensional image and the second two-dimensional image capture only a portion of the one side and the opposite side of the product, the portion being less than 10% of a length of the one side and the opposite side.

7. The method of claim 1, wherein the analyzing the first two-dimensional image and the second two-dimensional image includes determining centers of the slot, the centers being set as the positions of the slot at the one side and the opposite side.

8. The method of claim 1, further comprising determining a width of the slot at the one side and a width of the slot at the opposite side, and comparing the widths of the slot at the one side and the opposite side to determine a difference between the widths.

9. A machine for checking a quality of a product, the product being made from at least two cardboard portions connected to each other such that a slot extends from a first side of the product to a second side opposite the first side, the slot being expected to extend perpendicularly with respect to an outer edge of the product, the machine comprising:
    two cameras configured to capture a first two-dimensional image and a second two-dimensional image, respectively, in a stacking area for stacking the product; and
    a machine control configured to:
        in the first two-dimensional image and the second two-dimensional image, determine a first position and a second position, measured along the outer edge of the product, of the slot on the first side and the second side, respectively, of the product as a horizontal image coordinate location of the slot according to image coordinates with respect to a reference;
        determine an amount of offset between the first position and the second positon of the slot; and
        in response to a determination that the amount of offset is greater than a threshold, determining a squaring issue.

10. The machine of claim 9, further comprising a memory storing calibration data, the calibration data corresponding to positions of the slot correctly positioned relative to the two cameras.

11. The machine of claim 9, wherein the reference is a reference line where the slot is expected.

\* \* \* \* \*

UNITED STATES PATENT AND TRADEMARK OFFICE
CERTIFICATE OF CORRECTION

| | |
|---|---|
| PATENT NO. | : 11,327,027 B2 |
| APPLICATION NO. | : 16/635019 |
| DATED | : May 10, 2022 |
| INVENTOR(S) | : Alexandre Pauchard |

It is certified that error appears in the above-identified patent and that said Letters Patent is hereby corrected as shown below:

In the Claims

In Claim 9, at Column 8, Line 15, delete "positon" and insert --position--

Signed and Sealed this
Eleventh Day of October, 2022

Katherine Kelly Vidal
*Director of the United States Patent and Trademark Office*